United States Patent Office 3,627,483
Patented Dec. 14, 1971

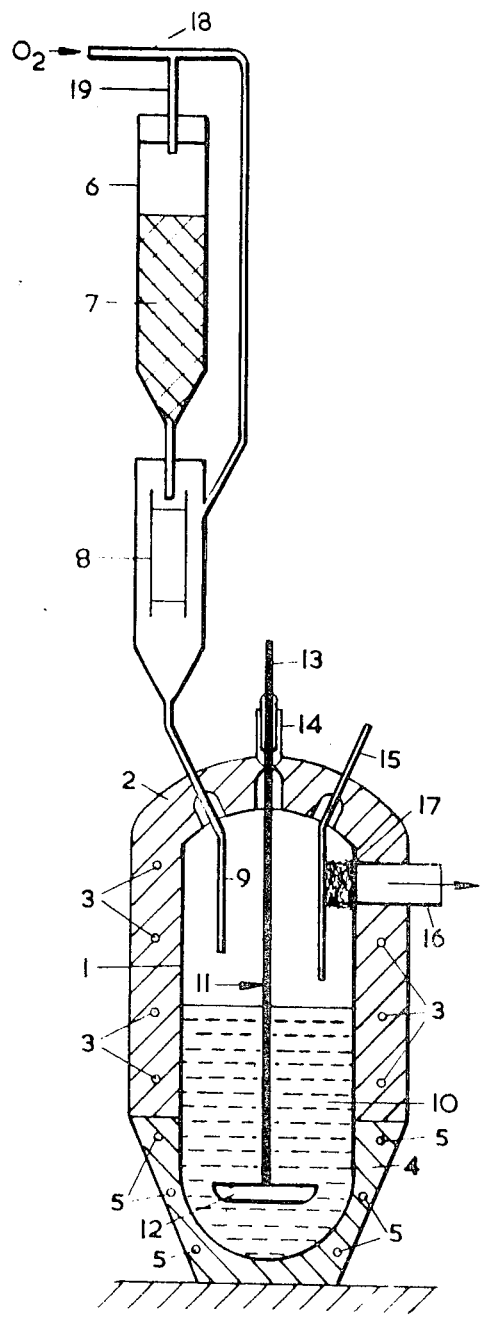

3,627,483
METHOD OF PURIFYING ALUMINUM CHLORIDE
Colin F. Cole and David John Spencer, Stockton-on-Tees, England, assignors to British Titan Products Company Limited, Durham, England
Filed Feb. 25, 1970, Ser. No. 14,238
Claims priority, application Great Britain, Mar. 29, 1969, 16,602/69
Int. Cl. C01f 7/58, 7/62
U.S. Cl. 23—93                                    12 Claims

ABSTRACT OF THE DISCLOSURE

A method of purifying aluminum chloride containing other metallic chlorides as impurities in which the aluminum chloride is fed into a molten mixture of an alkali metal salt and aluminum chloride having dispersed therethrough a metal more electropositive than iron but not more than aluminum to effect a reaction with the impurity metal chlorides. Preferably the metal is aluminum metal in the powdered form.

---

This invention relates to a purification process which involves the treatment of impure aluminium chloride to remove therefrom impurities in the form of metallic chlorides.

Commercial aluminium chloride is usually prepared by the chlorination of molten aluminium metal and contamination of the product by comparatively involatile chlorides such as those of magnesium, calcium, sodium, potassium and lanthanum, occurs due to their vaporisation at the high temperature of chlorination of the aluminium metal containing metallic impurities. The principal impurity is, however, iron chloride which is more volatile than these comparatively involatile chlorides.

Of the many uses of aluminium chloride one is in the production of titanium dioxide pigments by the vapour phase oxidation of titanium tetrachloride. The presence of chloride impurities in the aluminium chloride which is often added to the oxidation reactor or subsequently to form a coating on the pigment tends to discolour the pigment and accordingly it is desirable to employ as pure aluminium chloride as possible. In addition, the impurities also contaminate vaporisation equipment for aluminium chloride.

According to the present invention, a process for the treatment of impure aluminium chloride to reduce the amount of metallic chloride impurities comprises feeding impure aluminium chloride into a mixture of a salt of an alkali metal and aluminium chloride in the molten state in the presence of a metal more electropositive than iron but not more electropositive than aluminium and recovering aluminium chloride.

The process of the present invention enables a high degree of purity to be imparted to impure aluminium chloride containing metallic chloride impurities with iron chloride as the principal impurity.

The process of the present invention essentially involves the reaction in a molten salt mixture comprising an alkali metal chloride, and a metal being more electropositive than iron but not more electropositive than aluminium to reduce the proportion of metal chloride impurities in the aluminium chloride fed into the molten salt mixture. The particular metal used in the process depends on the particular impurity that it is desired to reduce but preferably the metal will be aluminium. Examples of other metals which also may be used are titanium, zirconium and zinc. The metal is present in its free state and should preferably be present in solid form, particularly in the form of a powder or other small sized particles mixed with the mixture of the salt of the alkali metal and the aluminium chloride in the molten form. In order to maintain the powdered metal in suspension within the molten salt mixture, it is desirable to agitate the mixture during the treatment of the impure aluminium chloride.

The process of the present invention is particularly designed for continuous operation in which impure aluminium chloride is continuously fed into the molten salt mixture whilst pure aluminium chloride vapour is removed with a carrier gas and recovered. The impure aluminium chloride fed into the molten salt mixture will usually be in the solid form.

The mixture of an alkali metal salt and aluminium chloride which is maintained in the molten state can be formed from any alkali metal salt but preferably is a halide and particularly is a chloride such as lithium chloride, sodium chloride, potassium chloride or caesium chloride and the proportions of the alkali metal halide and the aluminium chloride are conveniently chosen to give a relatively low melting eutectic composition. Preferably the proportion of the alkali metal halide in the mixture is from 20 mole percent to 50 mole percent and the proportion of aluminium chloride in the mixture is from 80 mole percent to 50 mole percent, both based on the total weight of the mixture. If desired, two or more different alkali metal salts can be present in the mixture in the molten state. For instance, it is possible to use a mixture of potassium chloride and sodium chloride or a mixture of potassium chloride and lithium chloride.

Generally, the process is operated under such conditions that the composition of the mixture in the molten state preferably having suspended therein a metal being more electropositive than iron but not more electropositive than aluminium remains substantially constant during the course of the treatment of the impure aluminium chloride. This is usually achieved by ensuring that the rate of feed of impure aluminium chloride into the mixture is such that it balances the amount of treated aluminium chloride removed from the melt by a carrier gas and by this means a substantially constant operating temperature is maintained. It is particularly desirable that the molten mixture should contain at least 60 mole percent of aluminium chloride in order that a sufficient vapour pressure of aluminium chloride is maintained to permit removal of the purified aluminium chloride from the molten mixture by contact with a carrier gas.

The particular temperature at which the treatment is operated depends on the temperature at which the mixture is molten. Usually, the process is carried out by maintaining the temperature of the molten mixture somewhat in excess of its melting point but below the sublimation temperature of pure aluminium chloride which is approximately 180° C. However, temperatures in excess of this sublimation temperature may be used and in such cases it is usually desirable that the impure aluminium chloride in fed into the molten mixture beneath the surface of the mixture to ensure contact of the impure material with the constituents of the mixture. With a suitable composition of the molten mixture, it would be possible to operate the process at a temperature in excess of 180° C. but it is desirable that at least a portion of the metal remains in its solid form in the mixture.

The proportion of the metal more electropositive than iron but not more electropositive than aluminium present in the molten mixture depends to a large extent on the amount of metal chloride impurity present in the impure aluminium chloride. Generally, it will be found that the impure aluminium chloride contains iron chloride expressed as iron in an amount of from 100 to 400 p.p.m. and to remove substantially the whole of this impurity in the process of the present invention requires an initial metal, for example aluminium, concentration in the molten mixture of about 10 grams/litre. Usually, the amount of the metal in the mixture will be from 5 to 100 grams/litre. During the course of the process, the metal powder is rendered inactive and requires to be replaced and accordingly, further additions of the metal powder are usually made during the course of the process when undertaking lengthy continuous operation.

The use of the metal suspended through the molten mixture has further advantage that corrosion of the vessel in which the reaction is carried out is inhibited. This permits the use of a reaction vessel of mild steel or other form of usually corrodable iron.

It is desirable that the impurity metal chlorides of less volatility or the free impurity metal produced during the course of the reaction by interchange with the impurity metal chlorides in the impure aluminium chloride feed should be easily separable from the aluminium chloride after treatment. It has been observed that the reaction taking place between the impure aluminium chloride and the mixture causes metallic iron to be deposited on the surface of the metal powder employed to react with the iron chloride. This metal powder has been found to settle from the mixture when agitation is ceased and the accumulated impurity and metal powder may be removed after settling, preferably through a valve in the base of the reaction vessel or by electromagnetic means or by filtration. When aluminium metal is employed as the metal, this generates aluminium chloride which is removed from the molten salt mixture during the course of the process. Since this is the same as the aluminium chloride present in the impure material no contamination of the aluminium chloride after purification is caused.

The purified aluminium chloride is preferably removed by a dry carrier gas which is supplied to contact the molten mixture during the course of the reaction to strip off purified aluminium chloride. Preferably the carrier gas is passed over the surface of the molten mixture. The carrier gas may be oxygen, particularly when the purified aluminium chloride is to be used in the production of titanium dioxide pigments by the vapour phase oxidation of titanium tetrachloride since it is desirable in this process to add aluminium chloride to the reactor in the oxygen stream to promote the formation of rutile titanium dioxide on oxidation. However, when the carrier gas is an oxidising gas such as air or oxygen then the temperature at which the aluminium chloride is purified should not be such as to cause reaction between the aluminium chloride and oxygen. Other gases which are suitable for use as carrier gas are inert gases such as nitrogen or argon. The carrier gas may also be a compatible vaporised liquid such as titanium tetrachloride vapour, particularly when the aluminum chloride is to be subsequently used in the production of titanium dioxide by the vapour phase oxidation of titanium tetrachloride.

An alternative process of stripping the treated aluminium chloride from the mixture is to pump the molten mixture to a packed column countercurrent to the carrier gas.

The aluminium chloride produced by the process of the present invention is substantially free of iron chloride when compared with the initial level of impurity present in the impure aluminium chloride. Other impurities which are present in the impure aluminium chloride in addition to those previously mentioned are the chlorides of e.g. zinc, tin, vanadium, chromium, manganese, gallium, cobalt, nickel and copper and these chloride impurities are either reduced to the metal or to less volatile chlorides during the treatment process and remain in the molten mixture as do the less volatile impurities such as magnesium chloride and calcium chloride.

The purified aluminium chloride can be used as indicated in the production of titanium dioxide by the vapour phase oxidation of titanium tetrachloride to control the degree of rutilisation of the pigment or, alternatively, it can be used to form a coating of aluminium oxide on the preformed particles of titanium dioxide. The purified aluminium chloride is particularly useful in this manner since it does not impart any substantial discolouration to the pigment obtained.

The invention is illustrated in the following examples. In the examples the apparatus shown in the accompanying diagrammatic drawing was employed.

The apparatus consists of a reaction vessel 1 having its upper portion surrounded by an insulating jacket 2 provided with electric heating elements 3 and its lower portion with a jacket 4 similarly provided with heating elements 5. A hopper 6 for impure aluminium chloride powder 7 is mounted above the reaction vessel 1 and positioned to feed aluminium chloride through a wheel feeder 8 into the reaction vessel 1 and through pipe 9 terminating above the surface of the molten mixture 10 contained within the vessel 1. The reaction vessel 1 is provided with a stirrer 11 having at its lower end blades 12 formed from polytetrafluoroethylene. The shaft 13 of the stirrer 11 is sealed with the reaction vessel 1 by a vapour seal 14. The raction vessel 1 is provided with an inlet pipe 15 for a carrier gas and an outlet pipe 16. The outlet 16 is provided at its inner end with a spray arrester 17 to exclude any material which may be splashed from the surface of the molten mixture 10 from the outlet 16.

The outlet 16 is attached to air cooled receiving vessels, not shown.

An inlet pipe 18 for a gas is provided to the wheel feeder 8 with a branch line 19 to the hopper 6 to effect feed of the aluminium chloride material 7 through the wheel feeder 8 into the reaction vessel 1.

EXAMPLE 1

Into the reaction vessel 1 shown in the drawing was placed 1,488 grams of aluminium chloride and 400 grams of sodium chloride. Heat was applied until the mixture was molten and the temperature was then raised to 160° C. The upper part of the reaction was maintained at this temperature by means of the electric heating elements embodied within the insulation 2. Thirteen and a half grams of pigmentary aluminium powder were then added to the melt to give an initial concentration of 12.5 grams Al per litre of the melt and the mixture stirred.

Impure aluminium chloride was fed from hopper 6 through wheel feeder 8 into the reaction vessel 1 at a rate of 5 grams/minute together with 1.4 litres/minute of oxygen gas through the wheel feeder 8. The impure aluminium chloride fed from the hopper 6 contained iron chloride in an amount 220 p.p.m. expressed as iron and 1,000 p.p.m. of magnesium expressed as magnesium oxide. Oxygen gas at a rate of 8 litres/minute was fed through inlet 15 on the surface of the molten mixture 10 within the reaction vessel 1 and a snow-white product was recovered in the air cooled receivers, not shown. The temperature of the molten mass was maintained at 160° C. and from time to time powdered aluminium metal had to be added to the melt to maintain the purity of the product obtained.

The total reaction time was 1,711 minutes during which time a total weight of 9,499 grams of impure aluminium chloride was fed into the reaction vessel 1 and a further 31.5 grams of aluminium powder added to replenish the powder rendered inactive in the mixture. 8,334 grams of product were obtained and the average analysis of the product showed that it contained iron compounds in an amount of 4 p.p.m. expressed as iron, 25 p.p.m. magnesium expressed as MgO and less than 10 p.p.m. of sodium express as $Na_2O$.

EXAMPLE 2

The experiment described in Example 1 was repeated except that the mixture placed in the reaction vessel 1 contained 1,516 grams of aluminium chloride, 346 grams of potassium chloride and 13.5 grams of aluminium metal powder. The temperature was maintained at 160° C. over a period of 3,175 minutes during which time 16,819 grams of impure aluminium chloride was fed into the reaction vessel from the hopper 6. A further quantity of 41 grams of aluminium metal powder was added to the reaction vessel during the course of the reaction. 15,002 grams of product were recovered having an average analysis of 2 p.p.m. iron compound expressed as iron, 11 p.p.m. magnesium expressed as MgO and less than 10 p.p.m. of potassium expressed as $K_2O$

What is claimed is:

1. A process for the production of an aluminum chloride substantially free of iron impurities, which comprises:
    (a) introducing solid aluminum chloride powder containing substantial iron as an impurity into a molten mixture of an alkali metal halide and aluminum chloride, maintained below approximately 180° C., and having solid powdered aluminum metal particles dispersed therein whereby a reaction takes place between the impure aluminum chloride and the mixture causing the metal iron impurities to be deposited on the surface of the solid aluminum metal particles employed to react with said aluminum chloride;
    (b) contacting the molten mixture with a dry carrier gas, which is inert in the process, to recover gaseous aluminium chloride substantially free of iron impurities; and
    (c) introducing the impure solid aluminum chloride into the molten mixture at a rate sufficient to balance the amount of gaseous aluminum chloride recovered, thereby maintaining a substantially constant temperature of the molten mixture.

2. A process according to claim 1 in which the metal is present in an amount of from 5 to 100 grams per litre of molten mixture.

3. A process according to claim 1 in which one or more additions of metal is made to the mixture during the course of the treament.

4. A process according to claim 1 in which the alkali-metal halide is an alkali-metal chloride.

5. A process according to claim 1 in which two or more different alkali-metal salts are present in the mixture.

6. A process according to claim 1 in which the mixture contains alkali-metal halide in an amount of 20 to 50 mole percent and aluminium chloride in an amount of from 80 to 50 mole percent based on the total weight of the mixture in moles.

7. A process according to claim 6 in which the amount of aluminium chloride in the mixture is at least 60 mole percent.

8. A process according to claim 1 in which impure aluminium chloride is fed into said mixture at a point beneath the surface of the mixture.

9. A process according to claim 1 in which the carrier gas is passed over the surface of the molten mixture.

10. A process according to claim 1 in which the carrier gas is air or oxygen.

11. A process according to claim 1 in which the carrier gas is an inert gas.

12. A process according to claim 1 in which the carrier gas is a vapourised titanium tetrachloride.

References Cited

UNITED STATES PATENTS

| | | | |
|---|---|---|---|
| 1,269,236 | 6/1918 | Weaver | 23—93 |
| 1,645,143 | 10/1927 | Humphrey et al. | 23—93 |
| 1,837,199 | 12/1931 | Brode | 23—93 X |
| 2,843,455 | 7/1958 | Pardee | 23—93 |
| 3,336,731 | 8/1967 | Phillips et al. | 23—93 |
| 3,341,283 | 9/1967 | Cleaver et al. | 23—93 |
| 3,388,993 | 6/1968 | Peterson et al. | 23—93 X |
| 3,406,009 | 10/1968 | Gould et al. | 23—93 |

EDWARD STERN, Primary Examiner

U.S. Cl. X.R.

23—1 D, 202 V